United States Patent [19]

Mueller et al.

[11] Patent Number: 5,544,956

[45] Date of Patent: Aug. 13, 1996

[54] ANTI-LOCK BRAKE SYSTEM AND/OR TRACTION CONTROL SYSTEM

[75] Inventors: Elmar Mueller, Markgroeningen; Dieter Kunz, Ditzingen, both of Germany

[73] Assignee: Robert Bosch GmbH, Stuttgart, Germany

[21] Appl. No.: 344,074

[22] Filed: Nov. 23, 1994

[30] Foreign Application Priority Data

Nov. 27, 1993 [DE] Germany .......................... 43 40 442.1

[51] Int. Cl.⁶ ........................................ B60T 8/32
[52] U.S. Cl. ........................ 303/196; 303/154; 303/194
[58] Field of Search ................................ 303/154, 176, 303/191, 192, 194, 195, 196; 364/426.03, 426.02, 426.01; 180/197

[56] References Cited

U.S. PATENT DOCUMENTS

| | | | |
|---|---|---|---|
| 4,018,486 | 4/1977 | Sutton | 303/195 |
| 4,924,396 | 5/1990 | Fujioka et al. | 364/426.03 |
| 4,938,544 | 7/1990 | Braschel et al. | 364/426.02 X |
| 4,965,729 | 10/1990 | Hafner | 303/196 X |
| 5,418,724 | 5/1995 | Iibohsi | 303/196 X |
| 5,425,574 | 6/1995 | Sano | 303/196 X |

FOREIGN PATENT DOCUMENTS

| | | | |
|---|---|---|---|
| 3232059 | 9/1988 | Japan | 303/196 |
| 4138958 | 5/1992 | Japan | 303/196 |
| 1378998 | 1/1975 | United Kingdom | 303/196 |

*Primary Examiner*—Robert J. Oberleitner
*Assistant Examiner*—Peter M. Poon
*Attorney, Agent, or Firm*—Felfe & Lynch

[57] ABSTRACT

First and second signals representing unevenness of the roadway are generated for at least one wheel, and brake pressure is controlled using control parameters based on the second signal. The first signal is compared to a first threshold which is dependent on the second signal, and an extreme value signal which represents large impacts on the vehicle is generated when the threshold is exceeded. The control parameters are then adjusted so that the channels for controlling brake pressure at each controlled wheel are less sensitive.

12 Claims, 3 Drawing Sheets

5,544,956

ANTI-LOCK BRAKE SYSTEM AND/OR TRACTION CONTROL SYSTEM

BACKGROUND OF THE INVENTION

A system for obtaining a signal which represents the surface of the roadway is disclosed by DE 41 33 238.5. The signal which is acquired in this way is fed here to an anti-lock brake system and/or traction control system in order to adapt these systems to the state of the roadway, which can take place by influencing controller parameters, e.g. coefficients or threshold values or set values. The degree of unevenness can be divided e.g. into eight classes, each of which brings about a specific adaptation.

If only the degree of unevenness is used, it is necessary to make a compromise between the speed of adaptation and the smoothness of the signal, which compromise may not be satisfactory. If the frequency of the filter is selected to be too low, the signal is very flat; however, sudden changes in the roadway can only be taken into account over a relatively long time frame. In contrast, an excessively high cutoff frequency leads to multiple jumps at the transitions between the classes.

SUMMARY OF THE INVENTION

By virtue of the invention, a lower control sensitivity in the case of vertical disturbances (e.g. manhole cover, ramps, uneven roadway) in comparison with the above is obtained, the oversensitivity of the ABS controller during control is reduced (=lower pressure modulation), the excitation of oscillations of the wheels by unfavorable phase position of the pressure modulation is prevented and shortenings of the braking distance on an uneven roadway as a result of better utilization of the coefficient of friction are achieved.

With the exertion of influence according to the invention, the slow degree of unevenness is supplemented by a fast extreme value signal for each wheel. Therefore, it is possible to utilize the advantages of a low cutoff frequency of the smoothing low-pass filter since sudden changes in the roadway can be detected by the fast signal.

In order to supplement the slow degree of unevenness, an additional, clearly faster signal is therefore used for individual activations (such as e.g. as a result of ramps, manhole covers, pothole) and extreme changes in the roadway. This signal has to be acquired for each wheel, at least for each wheel of the front axle.

For the determination, signals are used which have already been determined for the degree of unevenness. The extreme value signal is determined according to the following procedure pattern:

As a function of the current unevenness class, two thresholds are formed. Both thresholds are obtained by a multiplication of the current continuous degree of unevenness U by a factor k1 or k2. k1 can lie e.g. between 2 and 5 and be e.g. 3.5. k2 must be greater than 0 and smaller than 1 and can be e.g. 0.6. A signal VL1 . . . HR1 is produced whenever a positive going edge of the high-pass filtered and exponentiated spring compression travel signal VL . . . HR rises above or drops below the k1 threshold.

VL stands for left-hand front and VR for right-hand front, HL for left-hand rear and HR for right-hand rear. The signal, e.g. VL1, then remains active for a time which is dependent on the cycle time of the ABS/TCS controller and can be triggered when the threshold is reached again. In exactly the same way, in each case a signal VL2 . . . HR2—is produced in inverted fashion when a negative going edge drops below the k2 threshold. The signal also remains for a predefined time but can also be retriggered. The signals VL1 . . . HR1 make the associated controller additionally less sensitive to the acting degree of unevenness so that the control is not triggered by a sudden impact. The mode of operation of the signals VL2 . . . HR2 is of opposite tendency.

DETAILED DESCRIPTION OF THE PREFERRED EMBODIMENTS

Figure 1:
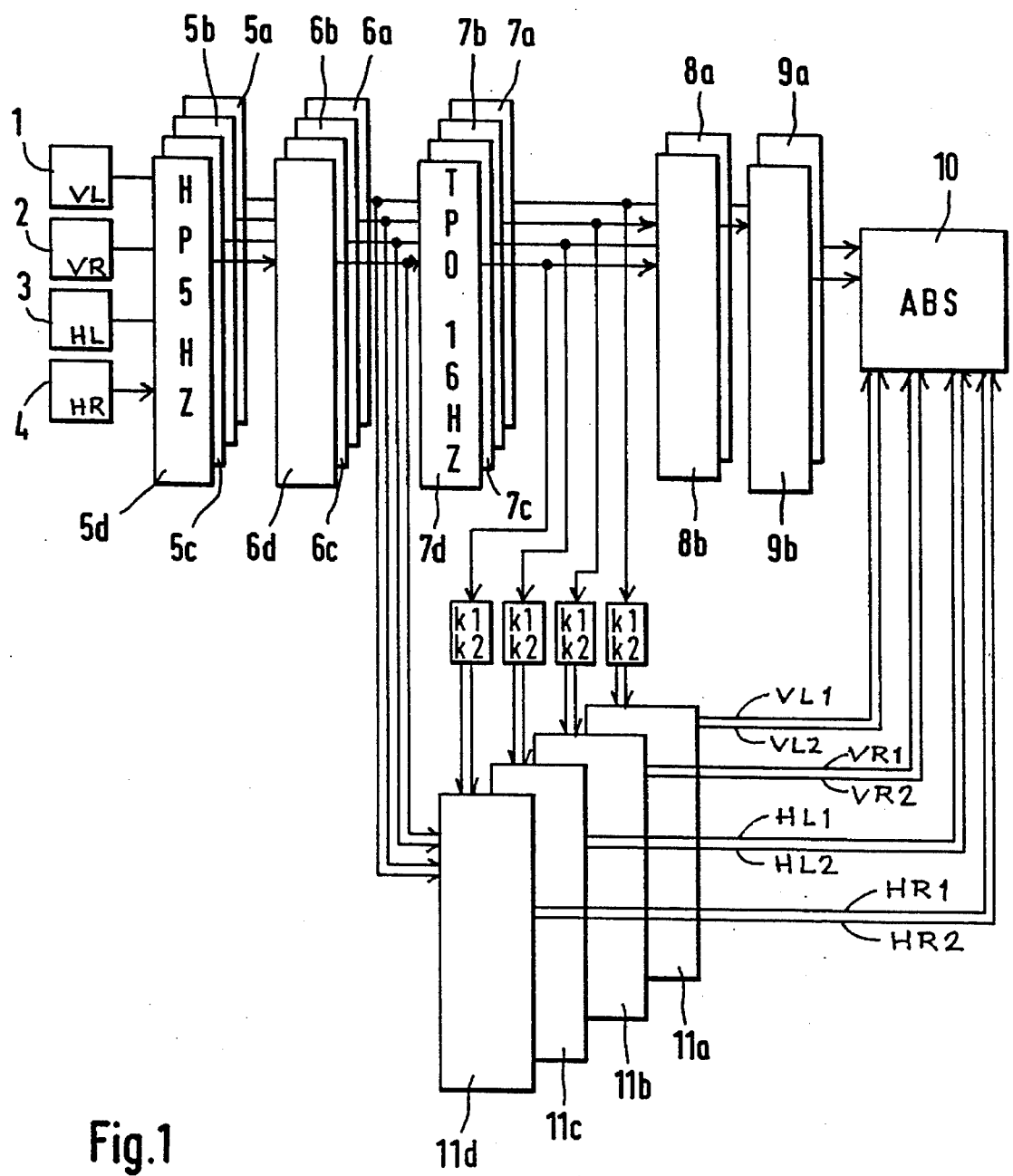
FIG. 1 is a block circuit diagram of the system according to the invention.

In FIG. 1, spring compression travel sensors (e.g. potentiometers) which are assigned to the four vehicle wheels are designated by 1 to 4. Their signals are each fed to a high-pass filter 5a to 5d with a cutoff frequency of e.g. 5 Hz which cuts off the low frequency portions. The high-pass filter can be a second order high-pass filter (Butterworth). The cutoff frequency should be clearly above the natural frequency of the vehicle body. In blocks 6a to 6d, amplitude formation (exponentiation) takes place by squaring the signals representing spring travel. Alternatively, a positive value representing amplitude may be generated by forming the absolute value of the high pass filtered signals from blocks 5a–5d. The remaining higher frequency portions are each smoothed in a low-pass filter (7a to 7d), also of the second order. The cutoff frequency of this low-pass filter determines both the adaptation speed of the unevenness class and the smoothness of the degree of unevenness. The cutoff frequency lies e.g. at 16 Hz. In blocks 8a and 8b, the average value of the signals of the wheels of the left-hand and of the right-hand side of the vehicle are formed.

The averaged values from blocks 8a and 8b are then fed to classifiers 9a and 9b which determine the associated classes 0 to 7 as a function of the size of the incoming signals, 0 standing for a very even roadway and 7 for a roadway with a large number of unevennesses. Then, in each case one signal is available for the left-hand and the right-hand side of the vehicle, which signals are then fed to an ABS and/or TCS for influencing. It would also be possible to use only the spring compression travel signals of the front wheels and it is also possible to form in a single block 8 an average value of all four spring compression travel signals and the unevenness class is then assigned to the average signal or the two front wheel signals. The one or two signals are then fed to an ABS or TCS. Here, they vary incrementally e.g. response thresholds or set values or other parameters of the ABS control to the effect that the ABS or TCS controls more sensitively on a level roadway and correspondingly less sensitively on an uneven roadway.

The output signals of the amplitude formers 6 are fed to comparators 11a to 11d without filtering in the low-pass filters 7. Furthermore, two thresholds are formed for each wheel by multiplying the current continuous degree of unevenness U by a factor k1 or k2. A first output signal (e.g. VL1) is output by the comparators 11a to 11d when a positive going edge of the output signal of the amplitude formers 6 exceeds the associated K1 threshold. This signal is then present for a time matched to the cycle time of the ABS/TCS controller. Conversely, a second signal (e.g. VL2) is produced when a negative going edge drops below the k2 threshold. This signal also remains in existence for a predetermined time. According to a further embodiment, the factors k1 and k2 can be selected from a range of values based on the unevenness class by providing feedback from the classifiers 9a and 9b.

The eight output signals of the comparators 11 are also fed to the ABS and they serve to make suddenly less sensitive in relation to the acting degree of unevenness, when an impact occurs which produces a 1 output signal (e.g. VL1) of a comparator 11, so that the control is not triggered or cannot exert any substantial influence. Raising of the threshold could also occur here or a set pressure value can be reduced at the ABS or the pressure increase can be triggered at the ABS in only a delayed way or with a smaller gradient. If the value drops below the threshold k2U, the initiated measure explained above is reduced in relation to the acting degree of unevenness by the value which becomes established then.

Figure 2:
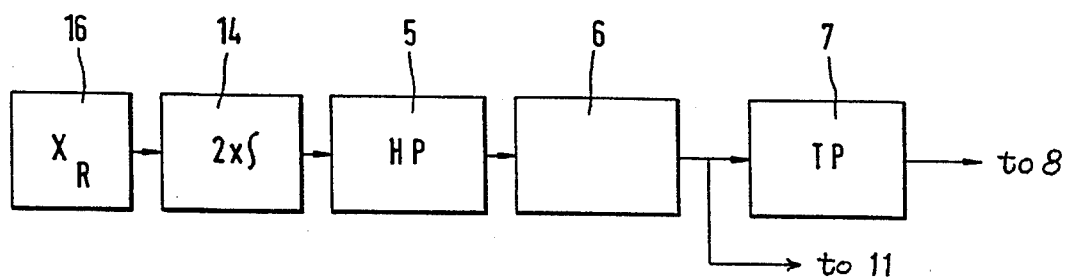
FIGS. 2 and 3 are block diagrams of subsystems wherein vertical wheel acceleration are used.
Figure 3:
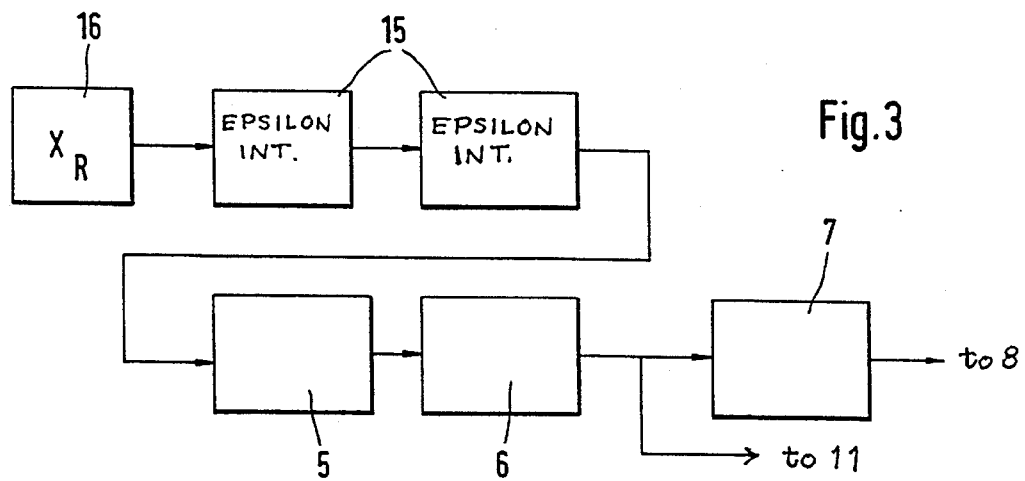

It has become apparent that, instead of the spring compression travel signals, vertical wheel acceleration signals $x_{\ddot{R}}$ (sensor 16 or derived from wheel speed) can also be used, which wheel acceleration signals $x_{\ddot{R}}$ are integrated twice before being fed to the high-pass filter, as is shown by FIG. 2. The high-pass filter 5, the amplitude formers 6 and the low-pass filter 7 are arranged downstream of the double integrator 14. In FIG. 3, the double integrator is replaced by two epsilon integrators 15.

Figure 4:
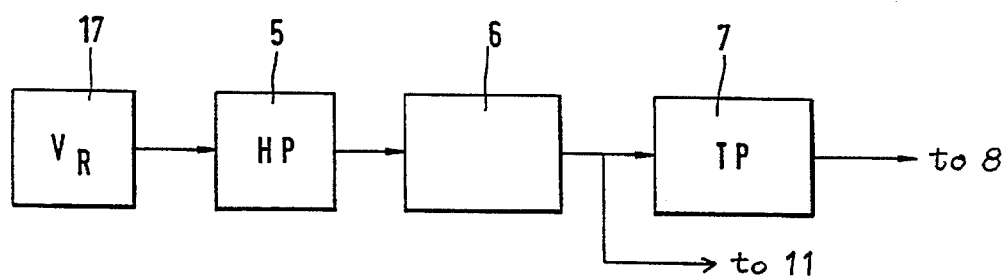
FIG. 4 is a block diagram of a subsystem wherein wheel velocity is used.

It has become clear that in the case that braking and acceleration are not occurring, the wheel speed VR (rpm) can also be used instead of the spring compression travel. The signal coming from the wheel speed sensor 17 is also fed here to a high-pass filter 5, an amplitude former 6 and a subsequent low-pass filter (see FIG. 4).

Figure 5:
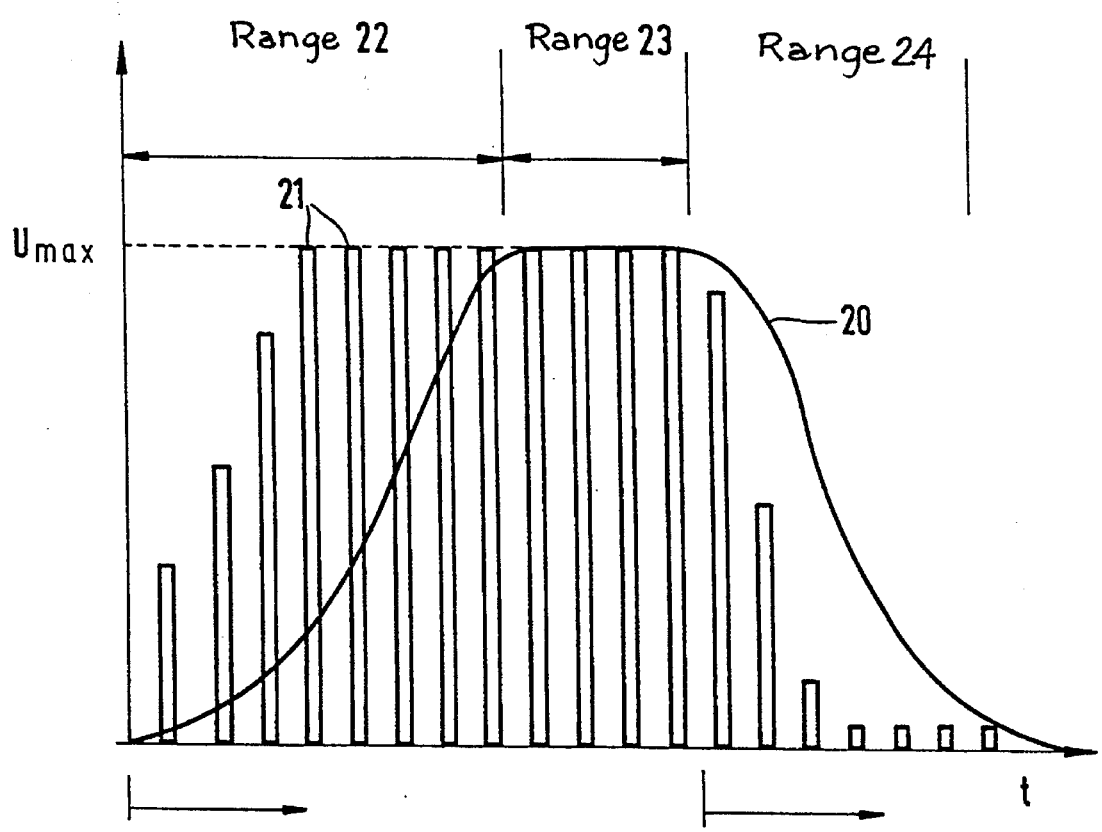
FIG. 5 is time plot of the degree of unevenness and extreme value signals.

FIG. 5 shows a diagram in which the degree of unevenness 20 and the extreme value signals 21 of one wheel are shown. Three ranges 22, 23 and 24 are shown. At 0 the vehicle travels onto a poor roadway, at the end of the range 23 onto a good roadway. In the area 22, the extreme value signals 21 support the effect of the degree of unevenness, in the range 23 only the degree of unevenness is effective and in the range 24 the extreme value signals weaken the degree of unevenness.

We claim:

1. Brake pressure control system for a vehicle having four wheels in contact with a roadway exhibiting unevenness, said system comprising means for generating a first signal representing the unevenness of the roadway for at least one wheel, means for generating a second signal representing the degree of unevenness of the roadway for said at least one wheel, means for generating control parameters for said at least one wheel based on said second signal, means for controlling brake pressure at each said wheel based on at least said control parameters, means for generating a first threshold for said at least one wheel which is dependent on said second signal for said wheel, means for comparing said first signal to said first threshold, means for generating a first extreme value signal when said first signal exceeds said first threshold, and means for varying said control parameters so that said means for controlling brake pressure is less sensitive when said first extreme value signal for said wheel is generated.

2. Brake pressure control system as in claim 1 further comprising means for generating a second threshold for said at least one wheel which is dependent on said second signal for said wheel, means for generating a second extreme value signal when said first signal falls below said second threshold, and means for varying said control parameters so that said means for controlling brake pressure is more sensitive when said second extreme value signal is generated.

3. Brake pressure control system as in claim 1 wherein said means for generating a first signal comprises means for generating a spring compression travel signal for said at least one wheel, a high pass filter for each said spring compression travel signal, and an amplitude former downstream of each said high pass filter, said amplitude former generating said first signal for said at least one wheel.

4. Brake pressure control system as in claim 3 wherein said means for generating said second signal comprises a low pass filter downstream of each said amplitude former, said low pass filter generating said second signal in dependence on said first signal.

5. Brake pressure control system as in claim 1 wherein said means for generating a first signal comprises means for generating a vertical wheel acceleration signal for said at least one wheel, integration means for twice integrating each said wheel acceleration signal, a high pass filter downstream of said integration means, and an amplitude former downstream of each said high pass filter, said amplitude former generating said first signal for said at least one wheel.

6. Brake pressure control system as in claim 5 wherein said means for generating said second signal comprises a low pass filter downstream of each said amplitude former, said low pass filter generating said second signal in dependence on said first signal.

7. Brake pressure control system as in claim 1 wherein said means for generating a first signal comprises means for generating wheel speed signals for said at least one wheel, a high pass filter for each said wheel speed signal, and an amplitude former downstream of each said high pass filter, said amplitude former generating said first signal for said at least one wheel.

8. Brake pressure control system as in claim 7 wherein said means for generating said second signal comprises a low pass filter downstream of each said amplitude former, said low pass filter generating said second signal in dependence on said first signal.

9. Brake pressure control system as in claim 1 wherein said means for generating control parameters comprises classification means for generating a roadway classification signal, said roadway classification signal being varied in response to said extreme value signal.

10. Brake pressure control system as in claim 9 wherein said means for generating a first signal generates a first signal for each wheel of the vehicle, said means for generating control parameters further comprising means for averaging the second signals for the left side of the vehicle and means for averaging the second signals for the right side of the vehicle, said classification means comprising a left side classifier and a right side classifier.

11. Brake pressure control system as in claim 9 wherein said means for generating a first signal generates a first signal for each front wheel of the vehicle, said classification means generating a roadway classification signal for each front wheel.

12. Brake pressure control system as in claim 9 wherein said means for generating a first signal generates a first signal for each wheel of the vehicle, said means for generating control parameters further comprising means for averaging the second signals for all four wheels, said classification means comprising a single classifier.

\* \* \* \* \*